(12) United States Patent
Anand et al.

(10) Patent No.: US 11,449,415 B2
(45) Date of Patent: Sep. 20, 2022

(54) SELF-SERVICE INTEGRATION AND FEATURE TESTING

(71) Applicant: Amazon Technologies, Inc., Seattle, WA (US)

(72) Inventors: Ankur Anand, Hyderabad, WA (US); Vikash Kumar Jain, Hyderabad, WA (US); Ayush Kumar, Kirkland, WA (US); Satya S. Mishra, Redmond, WA (US); Oloyede Olumide, Redmond, WA (US); Naga Bhimanadha Swamy Kalanadhabhatla, Bellevue, WA (US); Neha Goswami, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/093,565

(22) Filed: Nov. 9, 2020

(65) Prior Publication Data

US 2022/0114082 A1     Apr. 14, 2022

Related U.S. Application Data

(60) Provisional application No. 63/309,618, filed on Oct. 12, 2020.

(51) Int. Cl.
    *G06F 11/36* (2006.01)
(52) U.S. Cl.
    CPC ...... *G06F 11/3688* (2013.01); *G06F 11/3684* (2013.01); *G06F 11/3692* (2013.01)

(58) Field of Classification Search
    CPC ............. G06F 11/3688; G06F 11/3684; G06F 11/3692
    See application file for complete search history.

(56) References Cited

U.S. PATENT DOCUMENTS

| 8,627,296 | B1 | 1/2014 | Picard |
| 2005/0216330 | A1* | 9/2005 | Chao ...................... G06Q 10/00 705/7.25 |
| 2010/0191663 | A1* | 7/2010 | Gross ................... G06Q 10/087 705/341 |
| 2011/0016454 | A1* | 1/2011 | Paintai ................ G06F 11/3664 717/127 |
| 2011/0321012 | A1 | 12/2011 | Samantaray et al. |

(Continued)

OTHER PUBLICATIONS

International Search Report and Written Opinion for International Application No. PCT/US2021/054301 dated Feb. 1, 2022.

*Primary Examiner* — Wei Y Zhen
*Assistant Examiner* — Amir Soltanzadeh
(74) *Attorney, Agent, or Firm* — Thomas | Horstemeyer, LLP

(57) ABSTRACT

Disclosed are various embodiments for self-service integration and feature testing. In one embodiment, a test mode service receives a request to test an integration of a third-party system with a production system. The test mode service enables at least one plugin to test at least one function of the production system. The test mode service executes at least one function using the plugin(s) and data provided by the integration of the third-party system. The test mode service then reports a result of how the production system performs the function(s) associated with the plugin(s) using test data.

19 Claims, 6 Drawing Sheets

(56) References Cited

U.S. PATENT DOCUMENTS

| | | | |
|---|---|---|---|
| 2015/0242918 A1* | 8/2015 | McCarthy | G06Q 30/0639 705/26.43 |
| 2018/0349254 A1 | 12/2018 | Hui | |
| 2019/0230164 A1 | 7/2019 | Jain | |

* cited by examiner

Test Logs

Purchase order no. EHDSADDS
    Scenario: Basic order
    Test order received: Jan 21, 2020
    Test Result: Unmarked Purchase order no. QNDISBVF
    Scenario: Basic order
    Test order received: Jan 21, 2020
    Test Result: Success Purchase order no. FNSDIDSN
    Scenario: Basic order
    Test order received: Jan 22, 2020
    Test Result: Failure Purchase order no. PODAMPND
    Scenario: Quantity change
    Test order received: Jan 23, 2020
    Test Result: Failure

SELF-SERVICE INTEGRATION AND FEATURE TESTING

CROSS-REFERENCE TO RELATED APPLICATIONS

This application claims the benefit of, and priority to, U.S. Provisional patent application entitled "SELF-SERVICE INTEGRATION AND FEATURE TESTING," filed on Oct. 12, 2020, and assigned application No. 63/090,618, which is incorporated herein by reference in its entirety.

BACKGROUND

With the prevalence of interconnected computing systems, it is often the case that a first entity will need to integrate its systems with those of a second entity. In one example, the second entity is an electronic commerce provider, and the first entity is an organization that seeks to order items via the electronic commerce provider using its purchasing systems. The second entity will typically publish documentation for its an application programming interface (API), detailing the various API calls that it supports, including functionality, parameters, and return values. In some cases, the second entity will publish specifications for procurement PunchOut such as commerce extensible markup language (cXML) or electronic data interchange (EDI). In some cases, the second entity publishes documentation for a data interchange format that is used to upload instructions to the second entity for bulk processing. As with any customized software system, coding or configuration errors often occur, involving simple typographical errors or in some cases misunderstandings of how features operate. Testing is important to discover these errors and to confirm that specific features operate as intended.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1B is a drawing of an example user interface for viewing information about various testing scenarios that have been executed according to various embodiments of the present disclosure.

DETAILED DESCRIPTION

The present disclosure relates to integration and feature testing. In developing an integration between a first system operated by a first entity with a second system operated by a second entity, testing is important to discover coding or configuration errors. Such errors in various scenarios include, for example, simple typographical errors, misunderstandings about how features work, and failures to account for edge cases. While some errors are detectable at compile time or by way of a manual review, other errors are detectable only at runtime. Accordingly, thorough testing is crucial to discover errors in advance of production use.

Unfortunately, testing is often difficult and less than exhaustive. Integration with a live, production system usually involves setting up a testing system that replicates the functionality of the production system in order to test the integration. Setting up the testing system in some cases involves great effort to manually replicate the production system and reserves allocations of computing resources that could otherwise be put to production use. In some embodiments, the testing system is in a sandboxed environment to avoid impacts to the production system. In some scenarios, the testing system fails to fully replicate the production system, leading to a failure to detect real errors in the integration or features, or falsely detecting errors when they are not present. Further, in some scenarios, the code implementing the integration must be updated after testing to point to the production system instead of the testing system, which is another potential source for errors.

Various embodiments of the present disclosure introduce an architecture to modify a production system to facilitate self-service or assisted integration and feature testing without the need for a separate testing system or sandboxed environment replicating the production system, though the third party in some cases has a testing or sandboxed system. The integration code is configured to communicate with the final, production system, and one or more flags that configure either testing or production operation of portions of the production system are configured at the production system. If testing is enabled, undesired side effects associated with engaging with production system features are disabled. In the case of order processing and fulfillment systems of an electronic commerce provider, testing of an order placement integration should involve many real-world scenarios involving systems and subsystems whose different responses could affect the outcome. However, in testing an order placement integration, placing a test order should not result in a payment instrument actually being charged and should not result in a shipment actually being fulfilled.

Figure 1A:
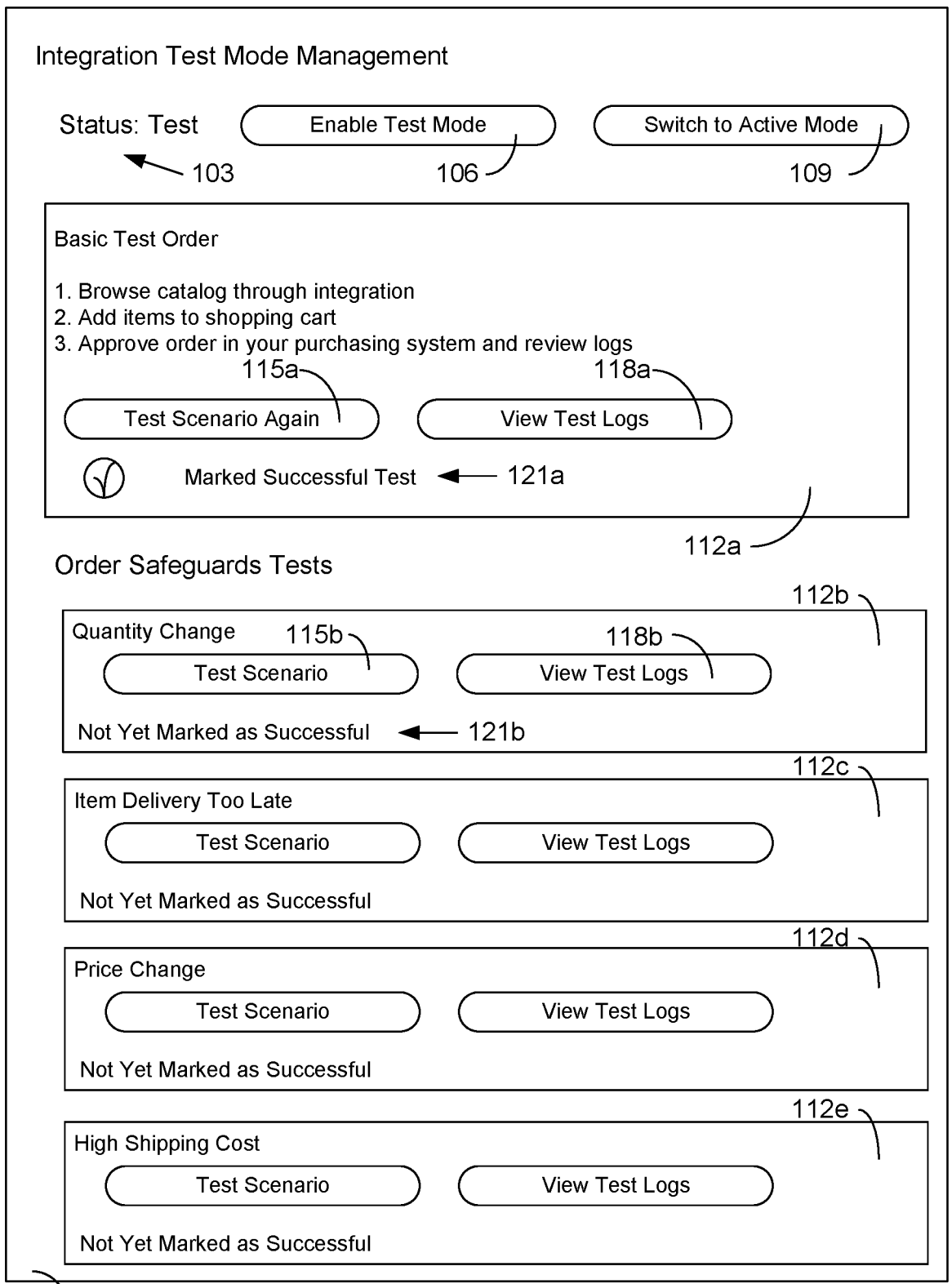
FIG. 1A is a drawing of an example user interface that facilitates management of a test mode service and selection of testing scenarios according to various embodiments of the present disclosure.

FIG. 1A shows an example user interface 100 that facilitates management of a test mode service and selection of testing scenarios as will be described. The various components described in the user interface 100 in some implementations correspond to buttons, sliders, radio buttons, hyperlinks, and/or other user interface input components. A status indicator 103 shows that the production system is currently in a test mode for the customer. Components 106 and 109 enable switching between the test mode, where purchase orders are not actually charged, fulfilled, and shipped, and an active mode where purchase orders are actually charged, fulfilled, and shipped.

Several possible testing scenarios 112 are presented for user selection. Scenario 112a corresponds to a basic order test. In one example, the basic order test is where the data in the submitted shopping cart, the received purchase order, and the shipping confirmation are validated. In the scenario 112a, the user is instructed to browse an item catalog of an electronic commerce provider using the integration of the user's purchasing system, add items to a shopping cart or basket, and then approve the purchase order through the purchasing system. Afterward, the user reviews the testing logs to observe the result of the test. In the scenario 112a, a component 115a causes the scenario 112a to be executed, and a component 118a causes the test logs to be presented in the user interface 100 or downloaded. A test result indicator 121a indicates whether the scenario 112a has been marked as successful.

Scenarios 112b-112e in this example correspond to various order safeguards tests, where each of the respective scenarios 112 manipulate a particular line item in the purchase order so that the user can see how the issue is handled by the integration of the purchasing system. For example, scenario 112b involves a quantity change implemented by the order processing and fulfillment system. In that example, the quantity of the item changes to be less than that specified in the test purchase order, and an order safeguard setting is configured to reject the item as a result. In the scenario 112b, like the other scenarios 112b-112e, a component 115b causes the scenario 112b to be executed, a component 118b causes the testing logs to be presented, and a test result indicator 121b shows that the test has not yet been marked as successful.

Scenario 112c corresponds to an item delivery that is too late. In that example, the order processing and fulfillment system sets an item delivery time frame configured to exceed an order safeguard setting configured for the integration of the purchasing system. For example, the order safeguard setting configures a maximum delivery time as four days, and the simulated item delivery time is five days.

Scenario 112d corresponds to an item price change. In that example, the unit price of the item increases from the time the item is added to the shopping cart to the time the purchase order is submitted, and the order safeguard setting configured for the integration of the purchasing system is configured to reject the item as a result. For example, the scenario 112d configures a change of an item price from $5.99 to $6.15, and the order safeguard setting rejects any item price increase.

Scenario 112e corresponds to a shipping cost that is too high. In that example, an item has a shipping charge that exceeds an order safeguard setting configured for the integration of the purchasing system. For example, the scenario 112e configures a change of a shipping charge from $10 to $21, and the order safeguard setting rejects any shipping charge greater than $20.

In other examples, the scenarios 112 include one or more of a scenario 112 that tests an invoice with shipping charges in the summary, a scenario 112 that tests an invoice with a special handling amount in the summary, a scenario 112 that tests an invoice with a discount amount in the summary, a scenario 112 that tests an invoice with shipping charges and a discount in the summary, a scenario 112 that tests an invoice with special handling charges and a discount in the summary, a scenario 112 that tests an invoice with tax, shipping charges, a special handling charges, and a discount in the summary, a credit memo with multiple lines with tax, shipping, a special handling charge, and a discount in the summary, and/or other scenarios 112.

FIG. 1B shows an example user interface 130 for viewing information about various testing scenarios 112 (FIG. 1B) that have been executed. The information in this example includes a purchase order identifier, a scenario identifier, a time/date when the purchase order was received, and a test result. Additional information is presented in other examples, such as detailed information about what data results were returned from specific components of the production system while under test mode. In other examples, user interface components are shown to enable searching for test orders by keyword, receive date, scenario type, result, and/or other criteria. In other example, the user interface 130 shows information about shopping sessions for which a purchase order was not received and/or shopping sessions that have failed for other reasons.

As one skilled in the art will appreciate in light of this disclosure, certain embodiments may be capable of achieving certain advantages, including some or all of the following: (1) reducing resource consumption of computer systems (e.g., in terms of processor time and memory utilization) by eliminating a separate, sandboxed, testing system that replicates the functionality of a production system; (2) reducing coding errors and inconsistencies introduced by creating a replica of a production system for testing purposes; (3) making the testing process for an integration more effective by using the actual production system; (4) reducing errors resulting from having to redirect an integration from a testing system to a production system; (5) improving flexibility of the testing architecture by creating plug-ins tailored to specific testing scenarios and components of the production system; (6) improving the user experience by making the testing self-service without a manual intervention by an administrator of the production system; and so forth. In the following discussion, a general description of the system and its components is provided, followed by a discussion of the operation of the same.

Figure 2:
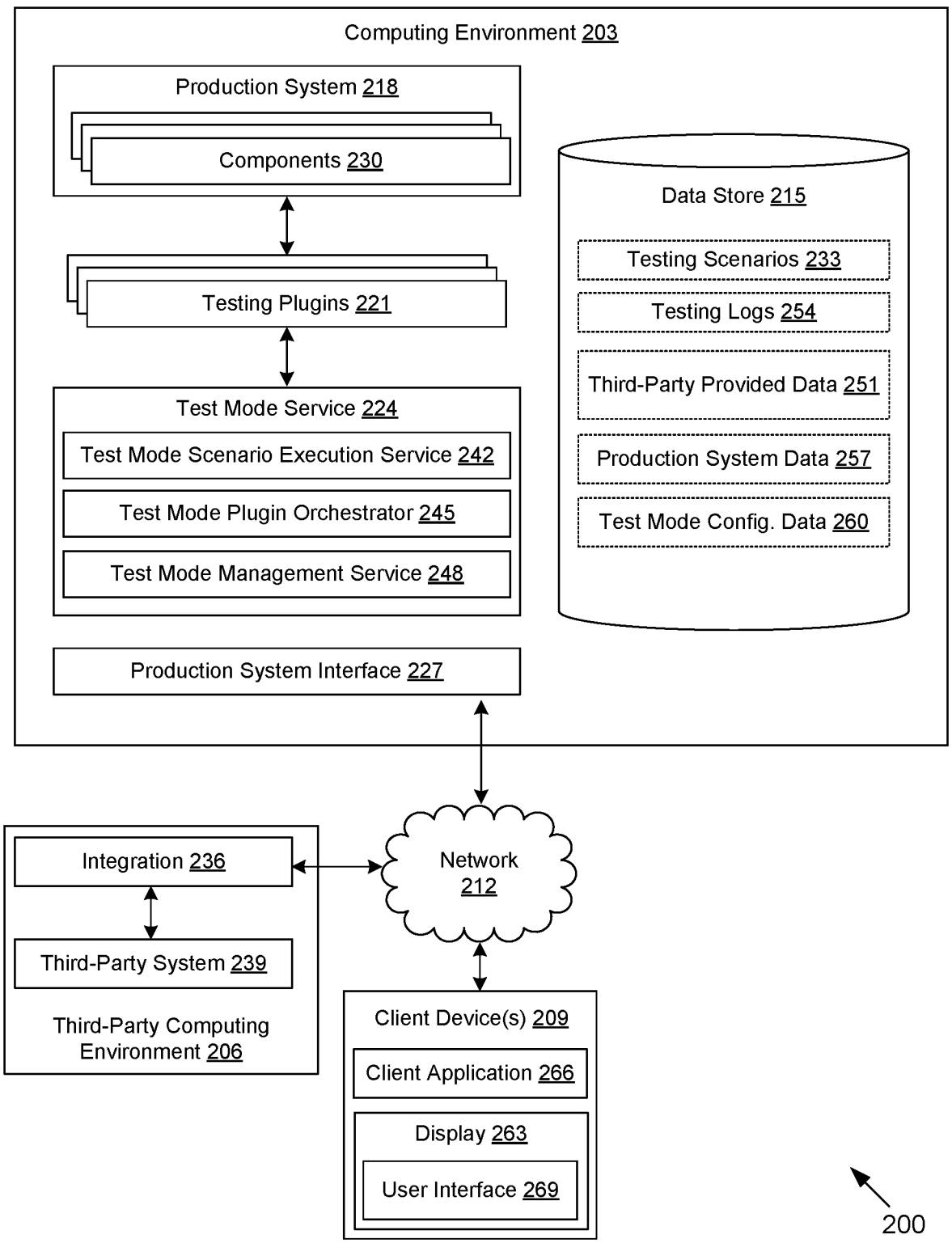
FIG. 2 is a schematic block diagram of a networked environment according to various embodiments of the present disclosure.

FIG. 2 illustrates a networked environment 200 according to various embodiments. The networked environment 200 includes a computing environment 203, a third-party computing environment 206, and one or more client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

In one or more embodiments, the computing environment 203 comprises, for example, a server computer or any other system providing computing capability. Alternatively, the computing environment 203 in one or more embodiments employs a plurality of computing devices that may be arranged, for example, in one or more server banks or computer banks or other arrangements. Such computing devices are in some examples located in a single installation or distributed among many different geographical locations. For example, the computing environment 203 includes a plurality of computing devices that together may comprise a hosted computing resource, a grid computing resource, and/or any other distributed computing arrangement. In some cases, the computing environment 203 corresponds to an elastic computing resource where the allotted capacity of processing, network, storage, or other computing-related resources may vary over time.

Various applications and/or other functionality are executed in the computing environment 203 according to various embodiments. Also, various data is stored in a data store 215 that is accessible to the computing environment 203. The data store 215 in some cases is representative of a plurality of data stores 215 as can be appreciated. The data stored in the data store 215, for example, is associated with the operation of the various applications and/or functional entities described below.

The components executed on the computing environment 203, for example, include a production system 218, one or more testing plugins 221, a test mode service 224, a production system interface 227, and/or other components. The production system 218 is executed to provide a live production service on behalf of the operator of the computing environment 203. In one embodiment, the production system 218 is an order placement, processing, and fulfillment system operated by an electronic commerce provider. The production system 218 includes a plurality of components 230, which are systems and subsystems that operate to provide the service(s) of the production system 218. The components 230 in some examples are arranged in a pipeline to process third-party provided data such as purchase orders. The components 230 in some situations normally implement a non-reversible state change when executed.

In one embodiment, the components 230 include one or more of an order placement service that facilitates receipt, placement, and confirmation of purchase orders; a payment processing service for charging payment instruments such as bank accounts, charge accounts, payment cards, gift cards, and so on; an inventory service that maintains a virtual representation of inventory across one or more fulfillment centers and facilitates reservations of inventory to fulfill purchase orders; a shipment planning service that selects inventory in one or more fulfillment centers in an optimal way; a fulfillment service that coordinates picking, packing, and shipment of orders in one or more fulfillment centers; a shipping carrier service that coordinates transportation of shipments via one or more shipment carriers; a last-mile delivery service that coordinates delivery of shipments to destinations; and/or other components 230.

The testing plugins 221 are individual plugins that implement features of testing scenarios 233 with respect to the components 230 of the production system 218. In particular, when a testing mode is enabled, a respective testing plugin 221 communicates with one or more components 230 of the production system 218 in order to disable actions resulting in a non-reversible state change, or to reverse state changes associated with processing test data such as purchase orders. In some cases, a respective testing plugin 221 blocks, prevents, or supersedes execution of one or more components 230 of the production system 218 so that the respective testing plugin 221 is able to replace the execution of the components 230 with simulated or dummy data. In one embodiment, a first testing plugin 221 is a payment plugin that allows a test purchase order to be placed using a test mode payment instrument, a second testing plugin 221 is an ordering plugin that creates a purchase document in the data store 215 based at least in part on a test purchase order submitted by a customer's system, a third testing plugin 221 is an inventory plugin that allows a test purchase order to be placed by fetching real-time inventory from an inventory component 230 of the production system 218, holding the inventory, and creating a purchase document.

The test mode service 224 is executed to enable test mode functionality for an integration 236 of a third-party system 239 with the production system 218. This provides self-service testing of the integration 236 without manual intervention by the operator of the production system 218. For example, the test mode service 224 executes test purchase orders in the production system 218 and communicates the results (e.g., order confirmations, shipping notifications, invoices) back to purchasing or procurement systems. In one embodiment, the test mode service 224 includes a test mode scenario execution service 242, a test mode plugin orchestrator 245, and a test mode management service 248. The test mode service 224 includes different constituent components in other embodiments. The test mode scenario execution service 242 is responsible for setting and executing a workflow specified by a testing scenario 233. The test mode plugin orchestrator 245 is a technical layer that invokes a subset of the testing plugins 221 as required for a testing scenario 233, based at least in part on input from the test mode scenario execution service 242. The test mode management service 248 generates user interfaces such as user interface 100 (FIG. 1B) that facilitate control of the test mode and selection of testing scenarios 233 and user interface 130 (FIG. 1B) that presents logs showing results of the execution of testing scenarios 233.

The production system interface 227 is a gateway to submit third-party provided data 251 such as purchase orders for processing by the production system 218. For example, the production system interface 227 supports an application programming interface (API) for communication between a third-party system 239 and the production system 218. In some embodiments, the production system interface 227 uses commerce extensible markup language (commerce XML), open buying on the Internet (OBI), electronic data interchange (EDI), and/or other frameworks. In some embodiments, the production system interface 227 facilitates browsing from an item catalog hosted by the production system 218 so as to select items for a shopping cart or basket to serve as the basis for a purchase order.

The data stored in the data store 215 includes, for example, one or more testing scenarios 233, one or more testing logs 254, third-party provided data 251, production system data 257, test mode configuration data 260, and potentially other data. The testing scenarios 233 individually test certain features of an integration 236 with the production system 218. Such features include, for example, placing a test purchase order, handling a quantity change in an order, handling an item delivery that is delayed beyond a threshold, handling a price change after an item is added to a shopping cart but before an order is placed, handling a shipping cost that exceeds a threshold, and other features.

The testing logs 254 record information regarding execution of testing scenarios 233 by the test mode service 224, similarly to that shown in the user interface 130. The third-party provided data 251 corresponds to the data provided by the integration 236 with the third-party system 239. In one instance, the third-party provided data 251 corresponds to a purchase order generated by an electronic procurement or purchasing system.

The production system data 257 corresponds to various data objects used by a production system 218. In one example, the production system data 257 includes a purchase document, or a representation of a purchase order for the electronic commerce provider. The test mode configuration data 260 includes one or more parameters that control the execution of the test mode service 224. For example, the test mode configuration data 260 includes a test mode setting that enables or disables test mode on a per-customer or per-account basis. The test mode configuration data 260 in some embodiments includes simulated data or dummy data that is used by one or more testing plugins 221 to assist in carrying out a test through bypassing components 230 that would effect a non-reversible state change.

In one or more embodiments, the third-party computing environment 206 comprises, for example, a server computer or any other system providing computing capability. Alternatively, the third-party computing environment 206 in one or more embodiments employs a plurality of computing devices that may be arranged, for example, in one or more server banks or computer banks or other arrangements. Such computing devices are in some examples located in a single installation or distributed among many different geographical locations. For example, the third-party computing environment 206 includes a plurality of computing devices that together may comprise a hosted computing resource, a grid computing resource, and/or any other distributed computing arrangement. In some cases, the third-party computing environment 206 corresponds to an elastic computing resource where the allotted capacity of processing, network, storage, or other computing-related resources may vary over time.

Various applications and/or other functionality are executed in the third-party computing environment 206 according to various embodiments. Also, various data is stored in a data store that is accessible to the third-party computing environment 206. The components executed on the third-party computing environment 206, for example, include a third-party system 239, an integration 236, and other components.

The third-party system 239 is a system operated by a third party who is different from the operator of the production system 218. In some examples, the third party is a customer of, and has an account, with the operator of the production system 218. The third-party system 239 communicates with the production system 218 to perform a function. In some examples, the third-party system 239 is an electronic procurement system or a purchasing system of the third party. The integration 236 corresponds to code or settings that enables communication between the third-party system 239 and the production system interface 227. In one example, the integration 236 configures the third-party system 239 to make specific API calls or generate documents in a particular format to be imported by the production system interface 227. The integration 236 in some cases is custom developed for the third party.

The client device 209 is representative of a plurality of client devices that may be coupled to the network 212. The client device 209 may comprise, for example, a processor-based system such as a computer system, may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, a smartwatch, a head mounted display, a voice interface device, or other devices. The client device 209 may include a respective display 263. The display 263 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 209 may be configured to execute various applications such as a client application 266 and/or other applications. The client application 266 may be executed in a client device 209, for example, to access network content served up by the computing environment 203 and/or other servers, thereby rendering a user interface 269 on the display 263. To this end, the client application 266 may comprise, for example, a browser, a dedicated application, etc., and the user interface 269 may comprise a network page, an application screen, etc. that enables management of a test mode service 224. The client device 209 may be configured to execute applications beyond the client application 266 such as, for example, email applications, social networking applications, word processors, spreadsheets, and/or other applications.

Next, non-limiting examples relating to integration with electronic commerce systems are described. An electronic commerce system includes systems to perform such functions as surfacing product recommendations, receiving an order, generating invoices, processing payments, managing inventory and handling shipping and returns, etc. Each of these functions is programmed to look to the value or status of a number of variables that dictate how an order will be processed. The integration system described defines a number of test scenarios that change how one or more of these functions will process an order.

In one embodiment, each test scenarios sets a combination of one or more plugins to execute a test order flow, such as written below in example 1 and example 2, that change the value or status of the flags or variables used by the functions to process an order. The user can select which test scenarios are enabled on a test mode user interface and will receive results showing how the ecommerce system acts in response to the changes made by the enabled Test Scenario.

In one embodiment, any purchase order placed from a third-party procurement system that is integrating with the ecommerce system contains a field that marks its order as a "TEST MODE" in, for example, an extensible markup language (XML) file that defines the purchase order. The electronic commerce system is programmed to look for this value in any incoming order file and if the value is present, to route the order to the integration system. The integration system proceeds to process the test mode purchase order by looking to see which of the test scenarios have been enabled by the customer. Internally, upon selection of these test scenarios the system enables one or more plugins for the particular test scenarios.

Those plugins that have been enabled operate to change or set the value of one or more of the predetermined variables or flags that are used by the ecommerce functions. In one embodiment, each script is written so that actual shipments or payments do not occur and that any inventory requested in an order is not actually deducted from the records of inventory on hand. The following pseudocode shows steps that may be performed by plugins to test payments or shipments.

Example 1: Payment Plugin Execution

In this scenario, a customer's intention is to test the message transmission flows and values, without making any payment for the order. Thus, the respective scenarios will call a payment plugin to set its value to a dummy payment instrument. This value allows the internal systems to execute the order flow without charging the customer. In another approach, the payment plugin will select one of the payment instruments setup in the customer's business account. The plugin will do this by calling the payments function, and the function will revert with the preferred payment instrument of the customer to execute a purchase. The plugin will set the payment instrument—preferred payment instrument (credit line, credit card, etc.) to execute the order flow. Once an order flow has been executed end-to-end, the plugin will receive the input from test order scenario execution service to release the payment instrument and reverse the payment flow. As the order was not shipped, the customer's payment instrument will not be charged and will no longer be used by the plugin until the next test order is received.

A payment plugin in test mode will setPayment=DummyPaymentInstrument (An internal payment method that provides all payment operations such as Credit, Debit, Balance, etc.).

Post-order processing, the payment plugin will reverse the payment, which is not needed if a payment is a dummy payment.

Example 2: Shipment Plugin Execution

In order to complete the end-to-end order flow, a dummy "virtual" shipment is generated. This ensures that the customer receives all end-to-end messages such as shipment notification and invoice. In one embodiment, the way this is executed is to call the shipment plugin to set the fulfilment value as fake ship generation. As this value is set, the order does not go through the fulfilment systems and no shipment takes place. However, the electronic commerce system is able to process the order end-to-end with dummy shipment values such as delivery dates and carrier tracking number. This enables the order flow to proceed to the next steps of generating and transmitting invoices to the customer.

The shipment plugin in test mode will:
set Fulfilment=FakeShipGen (to generate shipment receipt)
set Fulfilment=FakeShipComplete (after shipment receipt to stop real shipment)

In another example, if a plugin is written to see how the system will react to a 20% price change in an item, the plugin will set the value of the price variable that is checked by the electronic commerce system to increase the price by 20% from the price listed in the test purchase order. The system has its own tolerance limits and based on that, the system will respond how this order will continue. The plugin script is written to gather the results of how the ecommerce system behaves in response to the price change and to return the values to the customer in an XML file for the order.

Figure 3A:
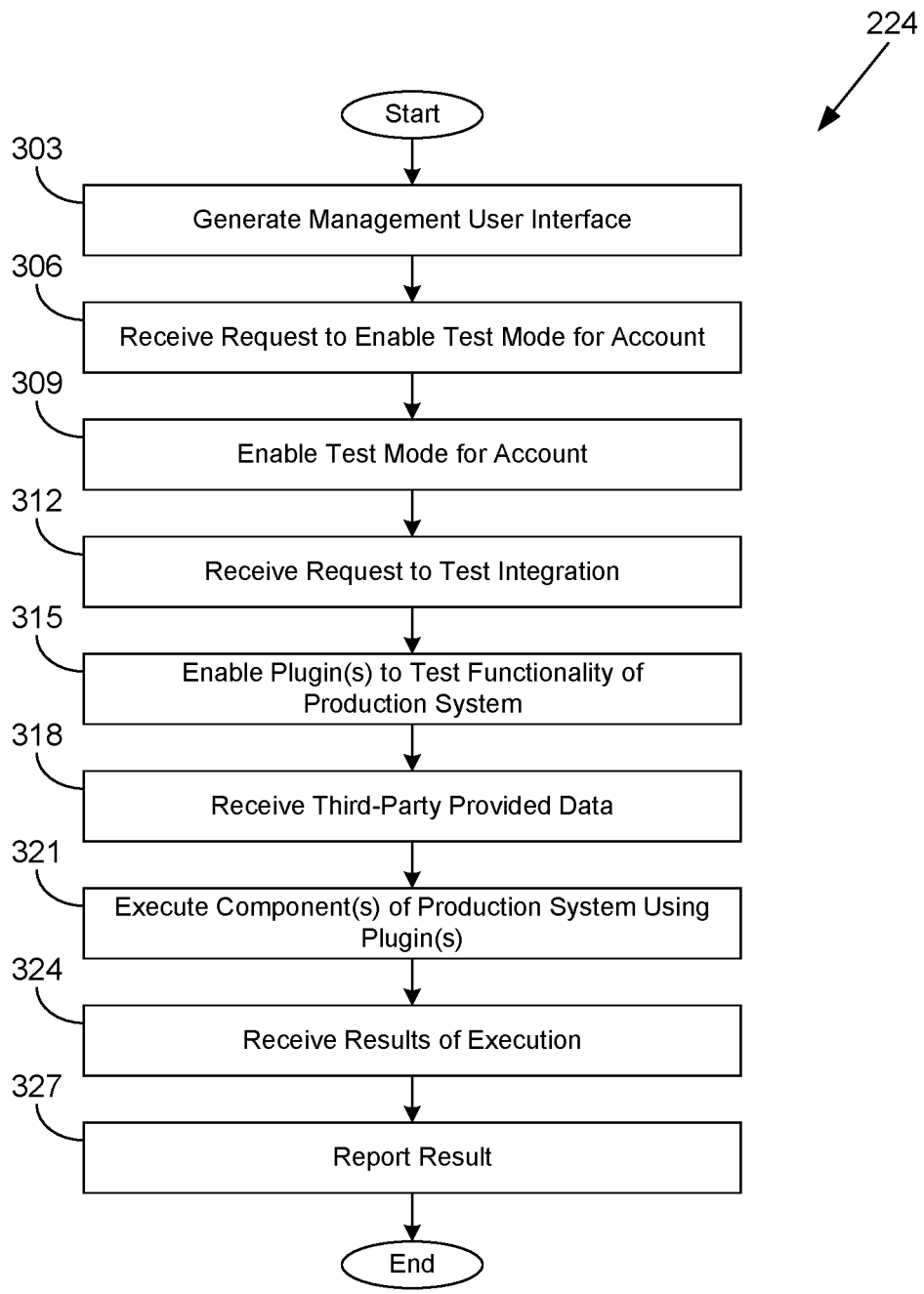
FIG. 3A is a flowchart illustrating one example of functionality implemented as portions of a test mode service executed in a computing environment in the networked environment of FIG. 2 according to various embodiments of the present disclosure.

FIG. 3A is a flowchart that provides one example of the operation of a portion of the test mode service 224 according to various embodiments. It is understood that the flowchart of FIG. 3A provides merely an example of the many different types of functional arrangements that may be employed to implement the operation of the portion of the test mode service 224 as described herein. As an alternative, the flowchart of FIG. 3A may be viewed as depicting an example of elements of a method implemented in the computing environment 203 (FIG. 2) according to one or more embodiments.

Beginning with box 303, the test mode service 224, by way of the test mode management service 248 (FIG. 2), generates a management user interface 269 (FIG. 2) in response to a request sent by a client application 266 (FIG. 2) executed on the client device 209 (FIG. 2). In another example, the request is generated via an account action on the production system 218. The management user interface 269 in one example is the user interface 100 (FIG. 1A). In box 306, the test mode service 224 receives a request to enable test mode for an account with the production system 218 (FIG. 2). In box 309, the test mode service 224 proceeds to enable test mode for the account, meaning that third-party provided data 251 (FIG. 2) provided to the production system 218 will not be processed in a normal way. For example, where the third-party provided data 251 corresponds to a purchase order, the production system 218 in test mode will not perform actions that result in non-reversible state changes (e.g., charges to payment instruments, actual fulfillment of orders, shipment of orders, etc.).

In box 312, the test mode service 224 receives a request to test an integration 236 (FIG. 2) of a third-party system 239 (FIG. 2) with the production system 218. In one example, the user selects a particular testing scenario 233 (FIG. 2) from a plurality of possible testing scenarios 233 listed within a management user interface 269 rendered by the client device 209.

In box 315, the test mode service 224 enables one or more testing plugins 221 (FIG. 2) to test functionality of one or more components 230 (FIG. 2) of the production system 218. In this regard, the test mode scenario execution service 242 (FIG. 2) sets up the workflow necessary to implement the selected testing scenario 233, such as identifying a subset of testing plugins 221 to be used, based at least in part on the test mode configuration data 260 (FIG. 2). Enabling the testing plugins 221 marks data processed by the components 230 of the production system 218 to be test data, such that the normal consequences of performing the functionality is blocked or reversed. For example, a testing plugin 221 injects one or more attributes into order data to mark the order data as test data.

In box 318, the test mode service 224 receives third-party provided data 251 such as a purchase order through the production system interface 227 (FIG. 2). For example, the third-party system 239 generates a purchase order by way of the integration 236, which allows items to be selected from an item catalog through the production system 218 and the third-party system 239, where the selected items are added to a shopping cart or basket for a purchase. The third-party provided data 251 in some cases corresponds to a shopping session, an order cancellation request, or an order return request. The test mode plugin orchestrator 248 (FIG. 2) then invokes the subset of testing plugins 221 to process the third-party provided data 251 based at least in part on the information provided by the test mode scenario execution service 242.

In box 321, the test mode service 224 executes one or more functions of one or more components 230 of the production system 218 using the subset of testing plugins 221. The testing plugins 221 in various scenarios cause the execution of one or more components 230 to be skipped and replaced with simulated or dummy data. The testing plugins 221 in various scenarios cause one or more components 230 to refrain from making a non-reversible state change (e.g., a charge to a payment instrument, non-reversibly reserving inventory, shipping an order through a shipping carrier, etc.). The testing plugins 221 in various scenarios cause one or more components 230 to reverse a state change (e.g., cancelling a payment authorization, refunding a payment charge, releasing reserved inventory, etc.).

In some examples, a payment processing plugin causes a payment processing service to use a test mode payment instrument for payment processing, an ordering plugin causes a purchase document to be created that is flagged as being a test order, an inventory plugin causes an inventory system to refrain from reserving inventory for the test order, an order notification plugin causes an order notification service to notify client applications 266 of the purchase documents, and so on.

In box 324, the test mode service 224 receives the result of executing the components 230 and/or the testing plugins 221. The test mode service 224 in some cases also receives results reported by the third-party system 239 or the integration 236. In box 327, the test mode service 224 reports the results of the selected testing scenarios 233 via a user interface 269 such as the user interface 130 (FIG. 1B). For example, the results indicate how the production system 218 processed a test purchase order or other data provided by the integration 236. Based on what is reported and/or what is reported by the third-party system 239 or the integration 236, a user in some embodiments marks a testing scenario 233 as failed or successful. In some embodiments, automated logic determines whether the testing scenario 233 is failed or successful based at least in part on the result. Thereafter, the operation of the portion of the test mode service 224 ends.

Figure 3B:
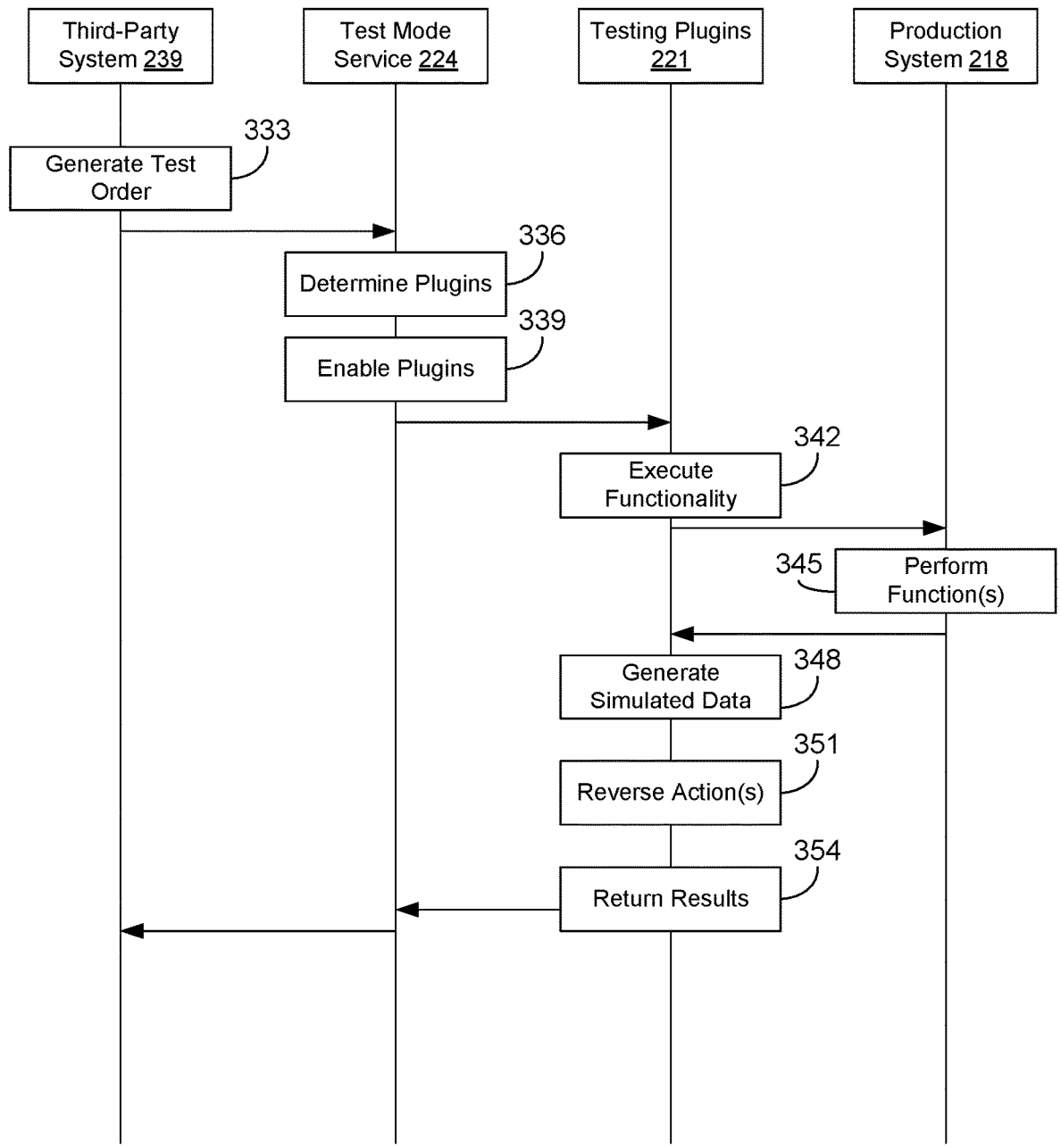
FIG. 3B is a sequence diagram illustrating one example of interaction among various components executed in a computing environment in the networked environment of FIG. 2 according to various embodiments of the present disclosure.

FIG. 3B is a sequence diagram 330 that provides one example of the interaction among the third-party system 239, the test mode service 224, the testing plugins 221, and the production system 218 according to various embodiments. It is understood that the sequence diagram 330 provides merely an example of the many different types of functional arrangements that may be employed to implement the interaction among the third-party system 239, the test mode service 224, the testing plugins 221, and the production system 218. As an alternative, the flowchart of FIG. 3B may be viewed as depicting an example of elements of a method implemented in the computing environment 203 (FIG. 2) according to one or more embodiments.

Beginning with box 333, the third-party system 239 generates a test purchase order. This follows a user corresponding to the third party enabling a testing scenario 233 (FIG. 2) via a user interface 269 (FIG. 2). The test purchase order is sent through the integration 236 (FIG. 2) over the network 212 (FIG. 2) to the production system interface 227 (FIG. 2). In one example, the production system interface 227 performs structural, authenticity, and authorization checks. If any of these tests fail, an error message is returned to the user via the user interface 269. The production system interface 227 enables one or more test mode flags and invokes the test mode service 224 to discover a corresponding workflow for the third party's chosen testing scenario 233. The test mode service 224 (FIG. 2) receives the test purchase order via the production system interface 227.

In box 336, the test mode service 224 determines a set of one or more testing plugins 221 to be enabled to facilitate testing of the production system 218 using the test purchase order. In box 339, the test mode service 224 enables the testing plugins 221, which causes the testing plugins 221 to inject one or more attributes in the test purchase order for testing of functionality of the production system 218.

In box 342, the testing plugins 221 execute one or more functions of the production system 218 to test the functions using the test purchase order. In this regard, the testing plugins 221 will set and unset attributes, do and reverse operations, create and delete dummy datasets, and so on. In one example, a payment testing plugin will set a payment instrument to be a dummy payment instrument. In one example, a shipment testing plugin will set fulfilment attributes to generate a shipment receipt and to stop a real shipment. In one example, an ordering testing plugin will place an order, an inventory testing plugin will reserve inventory, and once the order is placed, the ordering testing plugin will persist all required data to generate a test invoice. Then the inventory testing plugin will release the inventory, and the ordering testing plugin will cancel the order.

In box 345, the production system 218 executes the functions, returning to the testing plugins 221. The response of the testing plugins 221 will decide on a next set of actions such as to move to a next step, discontinue the workflow, and so on. In box 348, the testing plugins 221 generate simulated data to simulate one or more actions of the production system 218. In box 351, the testing plugins 221 reverses one or more actions of the production system 218. For example, a payment plugin in test mode will reverse a payment. In box 354, the results of how the production system 218 performs the functions using the test purchase order, including the simulated data as desired, are returned by the testing plugins 221 to the test mode service 224 and ultimately to the third-party system. Thereafter, the sequence diagram 330 ends.

Figure 4:
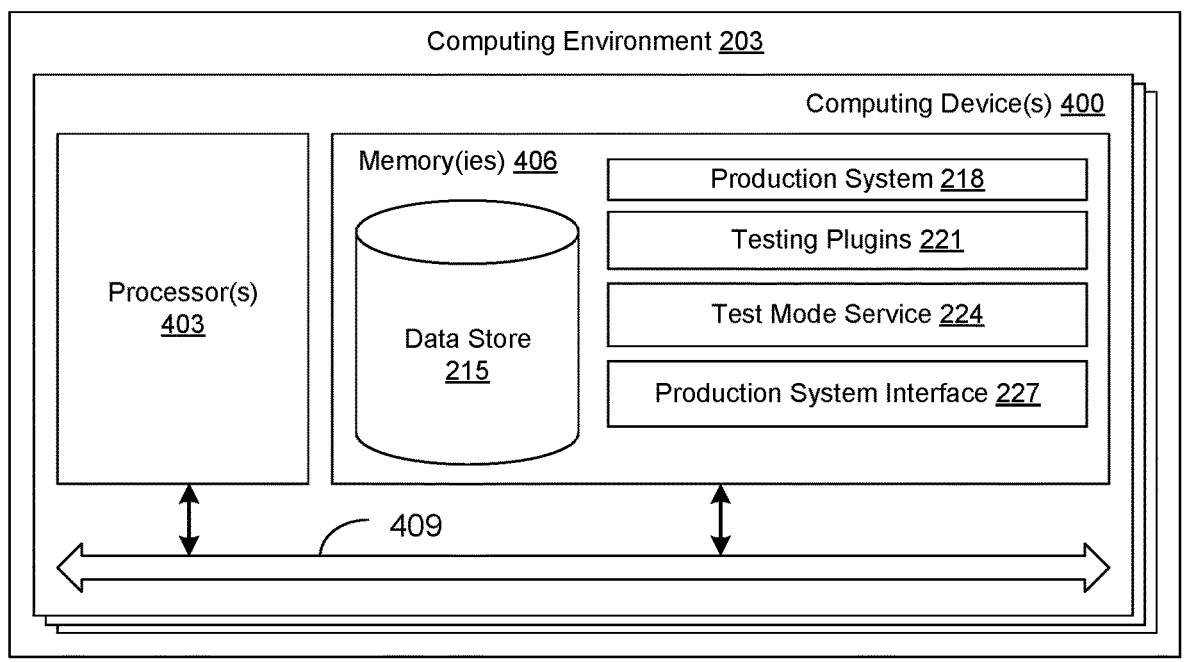
FIG. 4 is a schematic block diagram that provides one example illustration of a computing environment employed in the networked environment of FIG. 2 according to various embodiments of the present disclosure.

FIG. 4 is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 comprises, for example, at least one server computer or like device. The local interface 409 comprises, for example, a data bus with an accompanying address/control bus or other bus structure as can be appreciated.

Stored in the memory 406 are both data and several components that are executable by the processor 403. In particular, stored in the memory 406 and executable by the processor 403 are a production system 218, one or more testing plugins 221, a test mode service 224, a production system interface 227, and potentially other applications. Also stored in the memory 406 may be a data store 215 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the production system 218, the testing plugins 221, the test mode service 224, the production system interface 227, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3A shows the functionality and operation of an implementation of portions of the test mode service 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3A and the sequence diagram of FIG. 3B shows a specific order of execution, it is understood that the order of execution may differ from that which is depicted. For example, the order of execution of two or more blocks may be scrambled relative to the order shown. Also, two or more blocks shown in succession in FIG. 3A or 3B may be executed concurrently or with partial concurrence. Further, in some embodiments, one or more of the blocks shown in FIG. 3A or 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the production system 218, the testing plugins 221, the test mode service 224, and the production system interface 227, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the production system 218, the testing plugins 221, the test mode service 224, and the production system interface 227, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
receive a request to test an integration of a purchasing system operated by a third party with an order placement and fulfillment system operated by an electronic commerce provider and in live production, the integration comprising at least one of: code or settings that enable communication between the purchasing system and the order placement and fulfillment system;
enable at least one testing plugin that injects one or more attributes into order data of the order placement and fulfillment system, the one or more attributes marking the order data as test data to be processed by the order placement and fulfillment system;
execute at least one function of the order placement and fulfillment system through the at least one testing plugin using a test purchase order provided by the integration of the purchasing system;
wherein the at least one function of the production system normally implements a non-reversible state change when executed, and the at least one testing plugin blocks the non-reversible state change during testing of the integration of the purchasing system;
report a result of how the order placement and fulfilment system processes the test purchase order by executing the at least one function through the at least one testing plugin.

2. The non-transitory computer-readable medium of claim 1, wherein the at least one testing plugin reverses a reservation of inventory associated with executing the at least one function using the test purchase order.

3. The non-transitory computer-readable medium of claim 1, wherein the at least one testing plugin blocks fulfillment of a shipment associated with executing the at least one function using the test purchase order.

4. A system, comprising:
at least one computing device; and
instructions executable in the at least one computing device, wherein when executed the instructions cause the at least one computing device to at least:
receive a request to test an integration of a third-party system with a production system in live production, the integration comprising at least one of: code or settings that enable communication between the third-party system and the production system;
enable at least one plugin to test at least one function of the production system, wherein enabling the at least one plugin marks data processed by the production system as test data;
execute the at least one function of the production system using the at least one plugin and data provided by the integration of the third-party system;
wherein the at least one function of the production system normally implements a non-reversible state change when executed, and the at least one plugin blocks the non-reversible state change during testing of the integration of the third-party system; and
report a result of how the production system performs the at least one function associated with the at least one plugin using the test data.

5. The system of claim 4, wherein the integration of the third-party system is configured to communicate with the production system during testing.

6. The system of claim 4, wherein when executed the instructions cause the at least one computing device to provide self-service testing of the integration of the third-party system without a manual intervention by an operator of the production system.

7. The system of claim 4, wherein the production system includes a plurality of components arranged in a pipeline to process the data provided by the integration of the third-party system.

8. The system of claim 4, wherein the request to test the integration indicates a particular testing scenario, and when executed the instructions further cause the at least one computing device to at least identify the at least one plugin as a subset of a plurality of plugins based at least in part on the particular testing scenario.

9. The system of claim 8, wherein when executed the instructions further cause the at least one computing device to at least generate a user interface that facilitates a user selection of the particular testing scenario from a plurality of potential testing scenarios.

10. The system of claim 4, wherein the at least one plugin reverses a state change caused by execution of the at least one function of the production system.

11. The system of claim 4, wherein the at least one plugin simulates an operation of at least a portion of the production system using the data provided by the integration of the third-party system.

12. The system of claim 4, wherein the third-party system corresponds to a purchasing system of a third-party, the production system corresponds to an order placement and fulfillment system of an electronic commerce provider, and the data provided by the integration of the third-party system corresponds to a test purchase order.

13. A method, comprising:
receiving, via at least one computing device, a request to test an integration of a third-party system with a production system in live production, the integration comprising at least one of: code or settings that enable communication between the third-party system and the production system;
executing, via the at least one computing device, at least one function of the production system using at least one plugin and data provided by the integration of the third-party system;
reversing, via the at least one computing device, a state change caused by execution of the at least one function using the at least one plugin; and
wherein the at least one function of the production system normally implements a non-reversible state change when executed, and the at least one plugin blocks the non-reversible state change during testing of the integration of the third-party system;
reporting, via the at least one computing device, a result of how the production system performs the at least one function associated with the at least one plugin.

14. The method of claim 13, further comprising generating, via the at least one computing device, a user interface that facilitates a user selection of a particular testing scenario from a plurality of possible testing scenarios.

15. The method of claim 13, further comprising enabling, via the at least one computing device, the at least one plugin to test the at least one function of the production system.

16. The method of claim 13, further comprising preventing, via the at least one computing device, another state change caused by the execution of the at least one function of the production system using the at least one plugin.

17. The method of claim 13, further comprising blocking, via the at least one computing device, at least a portion of the execution of the at least one function of the production system using the at least one plugin.

18. The method of claim 17, further comprising providing, via the at least one computing device, simulated data corresponding to a simulation of the at least the portion of the execution of the at least one function of the production system using the at least one plugin.

19. The method of claim 13, wherein the third-party system corresponds to a purchasing system of a third-party, the production system corresponds to an order placement and fulfillment system of an electronic commerce provider, and the data provided by the integration of the third-party system corresponds to a test purchase order.

\* \* \* \* \*